(12) United States Patent
Nogueira et al.

(10) Patent No.: US 8,313,798 B2
(45) Date of Patent: Nov. 20, 2012

(54) STRUCTURAL COLORS HAVING UV REFLECTANCE VIA SPRAY LAYER-BY-LAYER PROCESSING

(75) Inventors: Grinia Michelle Nogueira, Cambridge, MA (US); Debasish Banerjee, Ann Arbor, MI (US); Michael F. Rubner, Westford, MA (US); Robert E. Cohen, Jamaica Plain, MA (US)

(73) Assignees: Toyota Motor Engineering & Manufacturing North America, Inc., Erlanger, KY (US); Massachusetts Institute of Technology, Cambridge, MA (US)

( * ) Notice: Subject to any disclaimer, the term of this patent is extended or adjusted under 35 U.S.C. 154(b) by 101 days.

(21) Appl. No.: 12/893,152

(22) Filed: Sep. 29, 2010

(65) Prior Publication Data

US 2011/0014366 A1 Jan. 20, 2011

Related U.S. Application Data

(63) Continuation-in-part of application No. 12/467,656, filed on May 18, 2009.

(51) Int. Cl.
*B05D 5/06* (2006.01)
(52) U.S. Cl. .................. 427/162; 427/164; 427/165
(58) Field of Classification Search ............ 427/162
See application file for complete search history.

(56) References Cited

U.S. PATENT DOCUMENTS

| | | | |
|---|---|---|---|
| 5,569,332 A | 10/1996 | Glatfelter et al. | |
| 6,156,115 A | 12/2000 | Pfaff et al. | |
| 6,399,228 B1 | 6/2002 | Simpson | |
| 6,565,770 B1 | 5/2003 | Mayer et al. | |
| 6,997,981 B1 | 2/2006 | Coombs et al. | |
| 7,141,297 B2 | 11/2006 | Condo et al. | |
| 7,215,473 B2 | 5/2007 | Fleming | |
| 2003/0059549 A1 | 3/2003 | Morrow et al. | |
| 2004/0156984 A1 | 8/2004 | Vitt et al. | |
| 2009/0046368 A1* | 2/2009 | Banerjee et al. | 359/584 |

(Continued)

FOREIGN PATENT DOCUMENTS

WO  WO 2008030474  *  3/2008

OTHER PUBLICATIONS

Parker, A. R., 515 million years of structural colour. *Journal of Optics A: Pure and Applied Optics* 2000, (6), R15.

(Continued)

*Primary Examiner* — Timothy Meeks
*Assistant Examiner* — Elizabeth Burkhart
(74) *Attorney, Agent, or Firm* — Gifford, Krass, Sprinkle, Anderson & Citkowski, P.C.

(57) ABSTRACT

A process for fabricating a structural color having ultraviolet reflectance is provided. The process includes providing an atomizing nozzle, a first nanoparticle solution and a second nanoparticle solution. The atomizing nozzle is used to spray a plurality of first nanoparticle solution layers, the plurality of first nanoparticle layers forming a low index of refraction stack. In some instances, a polymer solution can be sprayed before and/or after the spraying of each first nanoparticle solution layer. The atomizing nozzle is also used to spray a plurality of second nanoparticle solution layers, the plurality of second nanoparticle layers form a high index of refraction stack. Similar to the first nanoparticle solution layers, a polymer solution can be sprayed before and/or after the spraying of each second nanoparticle solution layer.

8 Claims, 8 Drawing Sheets

U.S. PATENT DOCUMENTS

2009/0153953 A1 6/2009 Banerjee et al.
2010/0003499 A1 1/2010 Krogman et al.

OTHER PUBLICATIONS

Parker, A. R., Natural photonic engineers. *Materials Today* 2002, 5, (9), 26-31.

Parker, A. R.; Townley, H. E., Biomimetics of photonic nanostructures. *Nat Nano* 2007, 2, (6), 347-353.

Hunt, S.; Cuthill, I. C.; Bennett, A. T. D.; Church, S. C.; Partridge, J. C., Is the ultraviolet waveband a special communication channel in avian mate choice? *J Exp Biol* 2001, 204, (14), 2499-2507.

Klem Jr, D., Preventing Bird-Window Collisions. *The Wilson Journal of Ornithology* 2009, 121, (2), 314-321.

Kurt, P.; Banerjee, D.; Cohen, R. E.; Rubner, M. F., Structural Color via Layer-by-layer Deposition: Layered Nanoparticle Arrays with Near-UV and Visible Reflective Bands. *Journal of Materials Chemistry* 2009, 19, 8920-8927.

Berdahl, P.; Akbari, H.; Levinson, R.; Miller, W. A., Weathering of roofing materials—An overview. *Construction and Building Materials* 2008, 22, (4), 423-433.

Wu, Z.; Lee, D.; Rubner, M. F.; Cohen, R. E., Structural Color in Porous, Superhydrophilic, and Self-Cleaning $SiO_2/TiO_2$ Bragg Stacks. *Small* 2007, 3, (9), 1467.

Krogman, K. C.; Zacharia, N. S.; Schroeder, S.; Hammond, P. T., Automated Process for Improved Uniformity and Versatility of Layer-by-Layer Deposition. *Langmuir* 2007, 23, (6), 3137-3141.

Krogman, K. C.; Lowery, J. L.; Zacharia, N. S.; Rutledge, G. C.; Hammond, P. T., Spraying asymmetry into functional membranes layer-by-layer. *Nat Mater* 2009, 8, (6), 512-518.

Choi, W.; Termin, A.; Hoffmann, M. R., The Role of Metal Ion Dopants in Quantum-Sized $TiO_2$: Correlation between Photoreactivity and Charge Carrier Recombination Dynamics. *The Journal of Physical Chemistry* 1994, 98, (51), 13669-13679.

Lee, D.; Omolade, D.; Cohen, R. E.; Rubner, M. F., pH-Dependent Structure and Properties of $TiO_2/SiO_2$ Nanoparticle Multilayer Thin Films. *Chemistry of Materials* 2007, 19, (6), 1427-1433.

Rahman, M.; Taghavinia, N., Layer-by-layer self assembly deposition and characterization of $TiO_2$ nanoparticles by using a short chain polycation. *The European Physical Journal Applied Physics* 2009, 48, 1062.

* cited by examiner

STRUCTURAL COLORS HAVING UV REFLECTANCE VIA SPRAY LAYER-BY-LAYER PROCESSING

RELATED APPLICATIONS

This application is a continuation-in-part application of and claims priority to U.S. patent application Ser. No. 12/467,656 filed on May 18, 2009, the contents of which are incorporated herein in their entirety by reference.

FIELD OF THE INVENTION

The present invention is related to a layer-by-layer process for producing structural colors having UV reflectance. In particular, the present invention is related to a spray layer-by-layer process for producing structural colors having UV reflectance.

BACKGROUND OF THE INVENTION

Structural color originates from the selective reflection of particular light wavelengths through constructive and destructive interference rather than absorption. The magnificent and brilliant colors found in nature originate from the interference of light within nanoscale periodic structures.[1-3] Most of the reflectors found in nature arise from the interference of light on stacks of thin films comprised of alternating low and high refractive index materials.[1,2] By appropriately selecting materials with refractive index contrast, one can build multiple stack films in order to mimic the brilliant colors found in nature. These films may be reduced to flakes and incorporated into a paint or coating system,[4,5] and they can also be used as a coating on glass windows to prevent bird collision[6-8].

The coloring mechanism based on light absorption, common in pigments, usually leads to a broad wavelength reflection with reflectivity around 50-60%. In contrast, light reflected from periodic nanostructures may achieve up to 100% reflectivity of a pure color.[8] The common coating systems, based on light absorption, are prone to photo-degradation and thermal oxidation when exposed to sun light; therefore, UV absorbers are usually added to the coating in order to increase its durability.[9] In principal, color based on a nanostructure material will not deteriorate under sun light exposure, since the coloring mechanism does not involve absorption and there are no polymers in the coating composition.

Bragg stacks (1D photonic crystals) with structural color and superhydrophilic and self-cleaning properties were reported by Wu et al.[10] with narrow range reflectance in the visible and near UV region obtained using a non-quarter wave design to build the multiple stack arrays. Kurt et al.[8] also reported that structural colors can be obtained via LbL assembly by alternating layers of high and low refractive index materials. Stacks with low refractive index were assembled with $SiO_2$ nanoparticles and Poly(allylamine hydrochloride) (PAH), and high refractive index stacks were assembled using $TiO_2$ nanoparticles and Poly(vinyl sulfonic acid) (PVS). Calcination was applied to remove the polymers after the deposition of each stack. Nanoporous stacks of $TiO_2$ and $SiO_2$ nanoparticles were successively deposited on top of each other until the optimum reflectance at a selected wavelength was achieved. By properly selecting nanoparticles size and experimental parameters, Kurt and co-workers were able to create coatings with tunable reflectance in the visible (structural colors) and near-UV light wavelengths.

The LbL technique, used by Wu and Kurt to create Bragg reflectors, has several advantages for thin films processing, such as low cost and conformal coating on several types of substrates.[11] However, this technique can be limited by the time required for polyelectrolyte assembly and, depending on the application, by the size or type of the substrate.

Krogman et al.[12-14] have disclosed an automated system for depositing thin polymer films from atomized mists of solutions containing species of complementary functionality. However, such a spray technique has not heretofor been used for making a multilayer structure having alternating and predetermined indices of refraction such that a structural color with ultraviolet reflectance is provided. As such, a spray LbL process that provides time efficient assembly of structural colors with less constraint on size and type of substrate would be desirable.

SUMMARY OF THE INVENTION

A process for fabricating a multilayer structure such that a structural color with ultraviolet reflectance is provided. The process includes providing an atomizing nozzle, a first nanoparticle solution and a second nanoparticle solution. The atomizing nozzle is used to spray a plurality of first nanoparticle solution layers, the plurality of first nanoparticle layers forming a low index of refraction stack. In some instances, a polymer solution can be sprayed before and/or after the spraying of each first nanoparticle solution layer. The atomizing nozzle is also used to spray a plurality of second nanoparticle solution layers, the plurality of second nanoparticle layers form a high index of refraction stack. Similar to the first nanoparticle solution layers, a polymer solution can be sprayed before and/or after the spraying of each second nanoparticle solution layer.

Additional layers can be sprayed in order to form a plurality of alternating low index of refraction stacks and high index of refraction stacks. The low index of refraction stacks and the high index of refraction stacks can further be calcinated to remove any undesirable polymer material and form a plurality of alternating low index of refraction layers and high index of refraction layers. The alternating low index of refraction layers and high index of refraction layers can have a dual reflection spectrum that reflects electromagnetic radiation in an ultraviolet region and a narrow band of electromagnetic radiation in a visible region.

The plurality of low index of refraction stacks and high index of refraction stacks can each have a non-quarter wave thickness and reflect more than 70% of the electromagnetic radiation in the ultraviolet region and more than 60% of the narrow band of electromagnetic radiation in the visible region. The first nanoparticles can be $SiO_2$ nanoparticles and the second nanoparticles can be $TiO_2$ nanoparticles. In some instances, the plurality of alternating stacks of low index of refraction and high index of refraction can be in the form of a flake and the flake may or may not be a pigment for a paint.

DETAILED DESCRIPTION OF THE INVENTION

The present invention discloses a process for fabricating a multilayer structure. As such, the present invention has utility as a process for making a multilayer structure that provides a structural color with ultraviolet (UV) reflectance.

The process can include providing an atomizing nozzle, or in the alternative, a plurality of atomizing nozzles. In addition, a first nanoparticle solution and a second nanoparticle solution are provided with the atomizing nozzle affording spraying a plurality of first nanoparticle solution layers and a plurality of second nanoparticle solution layers. Rinsing of each layer can be included before an additional layer is sprayed thereon.

The plurality of first nanoparticle layers can form a low index of refraction stack and the plurality of second nanoparticle layers can form a high index of refraction stack. In addition, the multilayer structure can have a plurality of alternating low index of refraction stacks and high index of refraction stacks, the low index of refraction stacks extending across the high index of refraction stacks and vice versa. In some instances, the low index of refraction stacks and/or the high index of refraction stacks can be calcinated to remove volatile material within and/or on the stacks, the result being the formation of alternating low index of refraction layers and high index of refraction layers. The alternating low index and high index of refraction layers can provide a dual reflection spectrum that reflects electromagnetic radiation in an ultraviolet region and a narrow band of electromagnetic radiation in a visible region.

In some instances, a polymer solution can be sprayed before and/or after the spraying of each first nanoparticle solution layer Likewise, a polymer solution can be sprayed before and/or after the spraying of each second nanoparticle solution layer. In such an instance, calcination of the multilayer structure can remove polymer material that is present after spraying the first polymer solution and the second polymer solution.

The spray layer-by-layer process provides for a time- and cost-efficient method for producing multilayer structures from nanoparticle solutions, the multilayer structures including structural colors having UV reflectance. In some instances, a structural color produced according to an embodiment of the present invention can reflect more than 70% of electromagnetic radiation in the ultraviolet region and more than 60% of a narrow band of electromagnetic radiation in a visible region.

Figure 1:
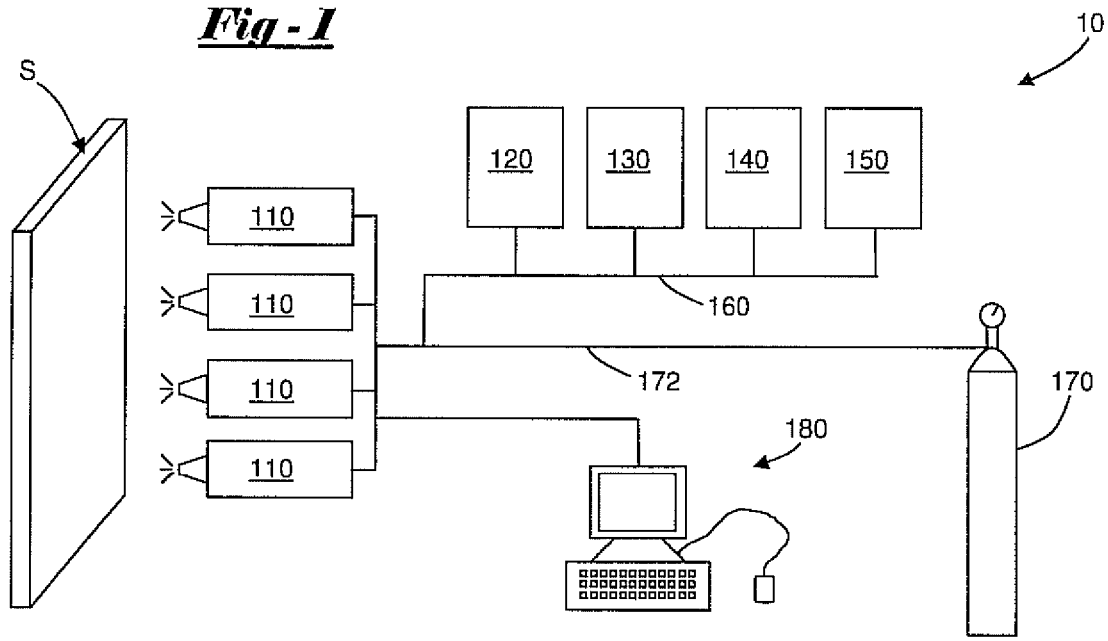
FIG. 1 is a schematic drawing of an automated spray-layer-by-layer system according to an embodiment of the present invention.

Turning now to FIG. 1, a schematic illustration of a spray-layer-by-layer system is shown generally at reference numeral 10. The system 10 can spray layers on a substrate S using a plurality of nozzles 110 in fluid communication with one or more solutions to be sprayed onto the substrate S. For example and for illustrative purposes only, a first solution 120, a second solution 130, a third solution 140, and a fourth solution 150 can alternately be sprayed onto the substrate S to provide a plurality of coated layers. In addition, a pressurized gas 170 can be fed through a supply line 172 to one or more of the nozzles 110 in order to provide for atomizing of a given solution. The system 10 can also be automated through the use of a controller, microprocessor, etc., illustratively shown as a computer 180 in FIG. 1.

Figure 2:
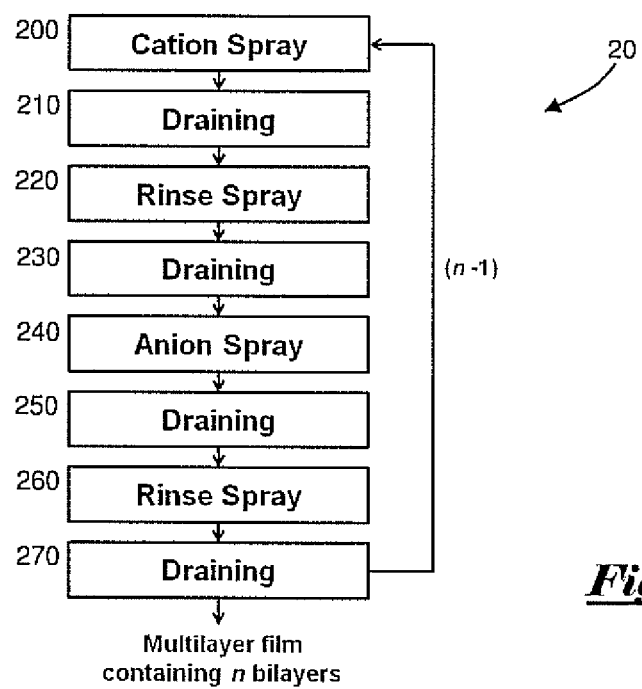
FIG. 2 is an embodiment of a process for producing multilayer structures using a spray-layer-by-layer process according to an embodiment of the present invention.

An embodiment of a process for providing a spray-layer-by-layer multilayer structure is shown in FIG. 2 at reference numeral 20. The process can include spraying alternate layers of a cation solution and an anion solution. As shown in FIG. 2, the method 20 can include spraying a cation solution at step 200 followed by draining of the sprayed layer at step 210. Thereafter, a rinse spray can be applied to the sprayed cation layer at step 220 followed by another draining step at 230. Once the cation sprayed layer has drained, been rinsed, and allowed to drain again, an anion layer can be sprayed at step 240 and thereafter followed by a similar draining, rinsing, draining series as shown at steps 250, 260, and 270. This process 20 can provide for a cation/anion bilayer.

The process can be repeated until a desired number of bilayers are produced. In some instances, the cation sprayed layer can include a nanoparticle solution and the anion sprayed layer can include a polymer solution. In the alternative, the cation sprayed layer can include a polymer solution and the anion sprayed layer can include a nanoparticle solution. In this manner, nanoparticle/polymer bilayers can be sprayed onto a substrate to provide uniform layers of nanoparticles sprayed or stacked on top of each other.

In the event that polymer material is not desired within a given series or stacking of nanoparticle layers, the substrate with the series of bilayers thereon can be calcinated in order to remove the polymer material. In particular, the substrate with the series of bilayers can be heated such that the polymer material decomposes, evaporates, etc., from the multilayer structure and thereby results in layers only made from nanoparticles.

In order to better illustrate and yet in no way limit the scope of the present invention, details and/or explanations of one or more examples of spray-layer-by-layer multilayer structures are provided.

EXAMPLES

Setup

An automated spray system available from Svaya Nanotechnologies, Inc. located in Sunnyvale, Calif. was used to produce spray layer-by-layer assemblies. The equipment has 4 atomizing nozzles connected to solenoid valves that can control fluid flow through via a logic relay. Nitrogen ($N_2$) gas was used as a pressurized fluid flow medium/carrier and solution atomizer, although other gases could be used and still fall within the scope of the present invention. Two of the nozzles were set up for spraying cationic or ionic solution, and the other two nozzles were used for rinsing. It is appreciated that other nozzle arrangements can be used.

Spray parameters, such as time of spraying, time of draining, number of bilayers, etc., were programmed using Zelio Soft 2 software and then transferred to a module coupled to the spray system for automatic assembly/spraying of multilayer structures. Solution flow rate was set by adjusting an aperture of a given nozzle. In addition, the $N_2$ gas pressure was set at either 25 or 30 pounds per square inch atmosphere (psia).

Cation/Anion bilayer(s) were sprayed using the automated spray system, a plurality of bilayers hereafter represented as [C(a)/A(b)]n, where a and b are the pH values of the cation (C) and the anion (A) solution, respectively, and n is the number of bilayers having been sprayed. A desired number of sprayed bilayers produced a "stack", the term stack defined herein as a nanoparticle multilayer assembly with a desired number of low index of refraction and/or high index of refraction bilayers.

Regarding bilayer materials, negatively charged $SiO_2$ nanoparticles (SM-30, average particle size 7 nanometers (nm), Aldrich) were diluted to 0.03 wt % solution in pH 9.0 buffer solution and then filtered through a 0.2 µm filter. Positively charged $TiO_2$ nanoparticles with 7 nm mean particle size were synthesized by controlled hydrolysis of titanium tetraisopropoxide $(Ti(OCH(CH3)_2)_4)$[8,15]. The resultant solution was filtered through 0.2 µm and 0.02 µm filters and then diluted to 0.03 wt % in deionized water. Solution pH was adjusted to 2.0 by adding 1.0 M HCl acid.

Polymer solutions of poly(allylamine hydrochloride) (PAH, Mw=70,000, Sigma-Aldrich) and poly(vinyl sulfonic acid sodium salt) (PVS, Mw=170,000, technical grade, 25% aqueous solution, Sigma-Aldrich) were diluted to 0.01 M repeat unit bases in deionized water. The pH was adjusted to 7.5 for the PAH solution and 2.0 for the PVS solution. Both polymer solutions were filtered using a 0.2 µm membrane filter after pH adjustment.

For a given multilayer assembly, clean substrates were oriented vertically and spaced apart from the nozzles, and then sprayed with a desired nanoparticle or polymer solution in order to produce a sprayed layer. Thereafter, the sprayed layer was allowed to drain, then rinsed, and then allowed to drain again. After the second draining, an additional desired polymer or nanoparticle solution was sprayed onto the preceding layer, the additional layer also being subjected to the drain-rinse-drain cycle before application of the next sprayed layer.

Draining time was set at 6 seconds (s) and rinsing time was set at 20 s. Rinsing solutions of 2.0 pH water and regular deionized water were used for the rinsing of $[TiO_2(2.0)/PVS(2.0)]n$ and $[PAH(7.5)/SiO_2(9.0)]n$ bilayers, respectively.

In some instances, multilayer assemblies were prepared by alternately spraying stacks of $[TiO_2(2.0)/PVS(2.0)]_{20}$ and $[PAH(7.5)/SiO_2(9.0)]_{60}$ with a $[TiO_2(2.0)/PVS(2.0)]_{20}$ stack sprayed as the first and last stack. Stated differently, a first stack of 20 $[TiO_2(2.0)/PVS(2.0)]$ bilayers was sprayed, with a drain-rinse-drain process between each layer, followed by a stack of 60 $[PAH(7.5)/SiO_2(9.0)]$ bilayers, followed by a stack of 20 $[TiO_2(2.0)/PVS(2.0)]$ bilayers, etc., until a desired number of stacks had been sprayed to produce a desired multilayer assembly.

Calcination was applied after assembling a desired number of bilayers and/or stacks in order to remove polymer material from the multilayer structure. For the purposes of the present invention, calcination is defined as a thermal treatment in which one or more bilayers and/or stacks of C(a) and/or A(b) are subjected to elevated temperature(s) to decompose and/or remove polymer material that is present from the sprayed polymer solutions.

In some instances, calcination for 2 h at 550° C. was performed on the multilayer assemblies. For example and for illustrative purposes only, calcination for 2 h at 550° C. was performed after every $SiO_2$ stack was assembled, after every $SiO_2$ stack and every fifth stack were assembled, only after every fifth stack was assembled and/or after all the stacks were assembled.

In some instances, a silicon substrate was used for preliminary tests due to the appearance of a color gradient on the substrate as multilayers were assembled thereon. VWR microscope glass slides were also used as substrate material when analyzing growth behavior and morphology of $[TiO_2(2.0)/PVS(2.0)]n$ and $[PAH(7.0)/SiO_2(9.0)]n$ bilayers.

Thicknesses and refractive indices of multilayer films on glass and silicon substrates were determined using a spectroscopic ellipsometer from Woolham Co. located in Lincoln, Nebr., and WVASE32 software with an incident angle of 70°. Refractive index values were calculated for a wavelength of 630 nm. Topographical images and roughness values (RMS) were obtained with Atomic Force microscopy (AFM) using a Digital Instruments D3000 Scanning Probe Microscope operating in tapping mode.

Computational simulation was used to design reflective films with reflectance in a specific range of the visible light wavelength (500-580 nm) and in near-UV using a non-quarter wave design. To reproduce the simulation, 20 bilayers of $[TiO_2(2.0)/PVS(2.0)]$ and 60 bilayers of $[PAH(7.5)/SiO_2(9.0)]$ per the computational simulation design results were alternately sprayed on a substrate. UV-Vis reflectance spectra were then taken for samples having between 3 to 11 stacks in order to visualize the increment in reflectance as a function of stack number, and to compare with simulated data. Cross-sectional transmission electron microscopy (TEM) was utilized by using a JOEL 2010F analytical electron microscopy. For TEM preparation, two small pieces were cut from a big slide and pasted together using M-bond and heated at about 100° C. for 30 min. Later, samples were prepared by performing mechanical grinding and then ion milling at low temperatures for 1.5 h.

Results

Figure 3:
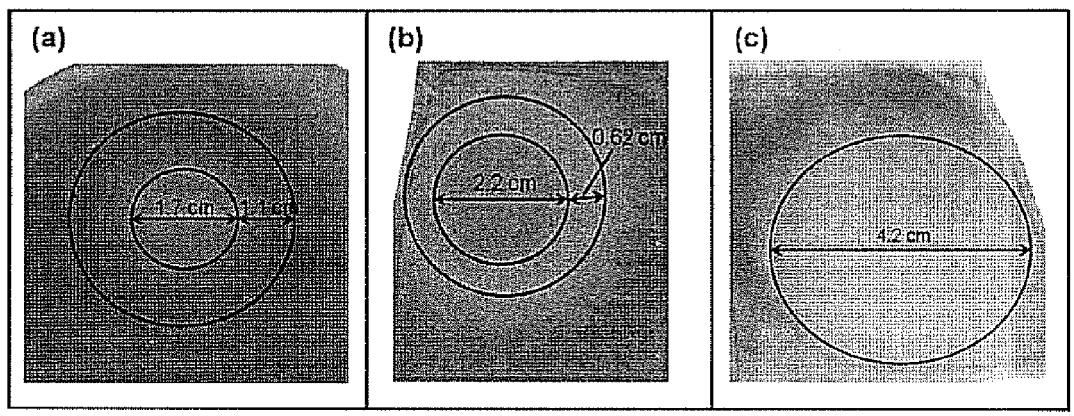
FIGS. 3A-3C are photographs illustrating increasing uniform thickness of layers sprayed onto a substrate.

Initial assemblies of multilayer samples exhibited significant color gradient along the substrate surface, thereby indicating that the thickness was not uniform along the length and/or width of the substrate. As a result, $N_2$ gas pressure, solution flow rate and spray time of polymer/nanoparticle solutions were studied using $[PAH(7.5)/SiO_2(9.0)]_{60}$ stacks on silicon substrates with significant changes in the coated area not observed for increasing the solution flow rate from 16 to 32 mL/min or decreasing the gas pressure from 30 to 25 psi. In contrast, increasing the spray time from 4 s to 12 s for each sprayed layer provided an increase in the area that was uniformly coated as illustrated in FIGS. 3a-3c. In particular, FIG. 3a illustrates a spray time of 4 s and a uniform thickness diameter of 1.7 cm, FIG. 3b illustrates a spray time of 8 s and a uniform thickness diameter of 2.2 cm and FIG. 3c illustrates a spray time of 12 s and a uniform thickness of 4.2 cm.

Regarding variations in film thickness, increasing the solution flow rate or the gas pressure resulted in thicker films. Since solution flow rate and pressure did not influence the uniformity of substrate area that was coated, a solution flow rate of 16 mL/min and a $N_2$ gas pressure of 25 psi were used for all subsequent sprayings. As stated above, a 12 s spray time for the $[TiO_2(2.0)/PVS(2.0)]n-[PAH(7.5)/SiO_2(9.0)]n$ multilayer system provided sufficient material to coat a circular area 4 centimeters (cm) in diameter and was thus adequate to coat a microscope glass slide.

Figure 4:
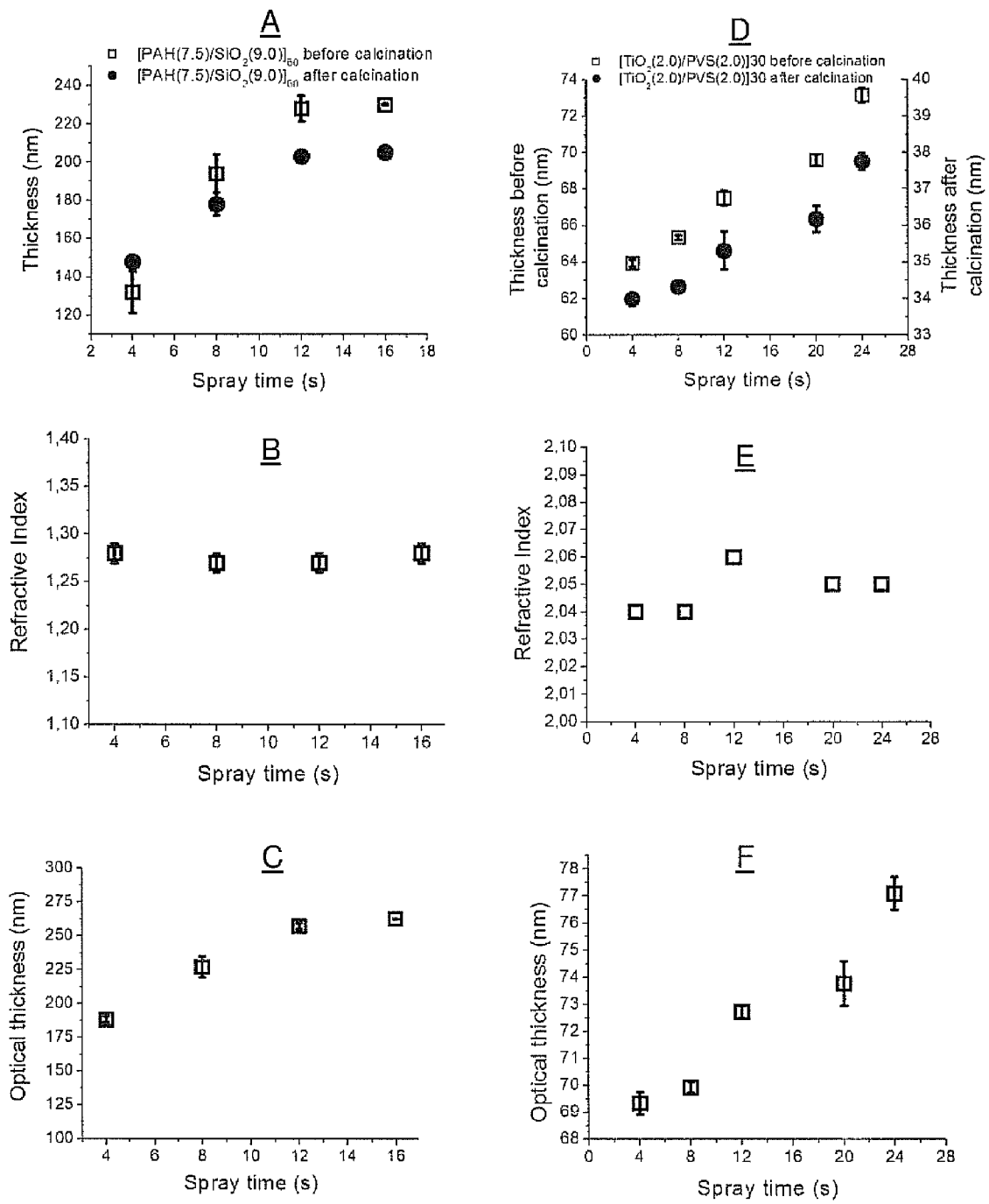
FIGS. 4A-4C are graphs illustrating thickness and optical properties for a [PAH(7.5)/SiO$_2$(9.0)]$_{60}$ stack.
FIGS. 4D-4F are graphs illustrating thickness and optical properties of a [TiO$_2$(2.0)/PVS(2.0)]$_{30}$ stack.

Thickness and optical properties as a function of spraying time for $[PAH(7.5)/SiO_2(9.0)]_{60}$ multilayer films are shown in FIGS. 4A-4C. The maximum adsorption of polymer and nanoparticles on the substrate was reached for a spraying time of 12 s with spraying for longer times not increasing the thickness of the multilayer films. The refractive index was constant for all the spray times analyzed and the optical thickness (thickness×refractive index) became constant at the 12 s spraying time. As such, an optimum spray time of 12 s was determined through the coating optimization process. It is appreciated that the optical thickness is one of the main variables used to calculate and simulate reflectivity of a multiple stack film[8] and control of this variable can be crucial to reproduce designs of structural colors.

Figure 5:
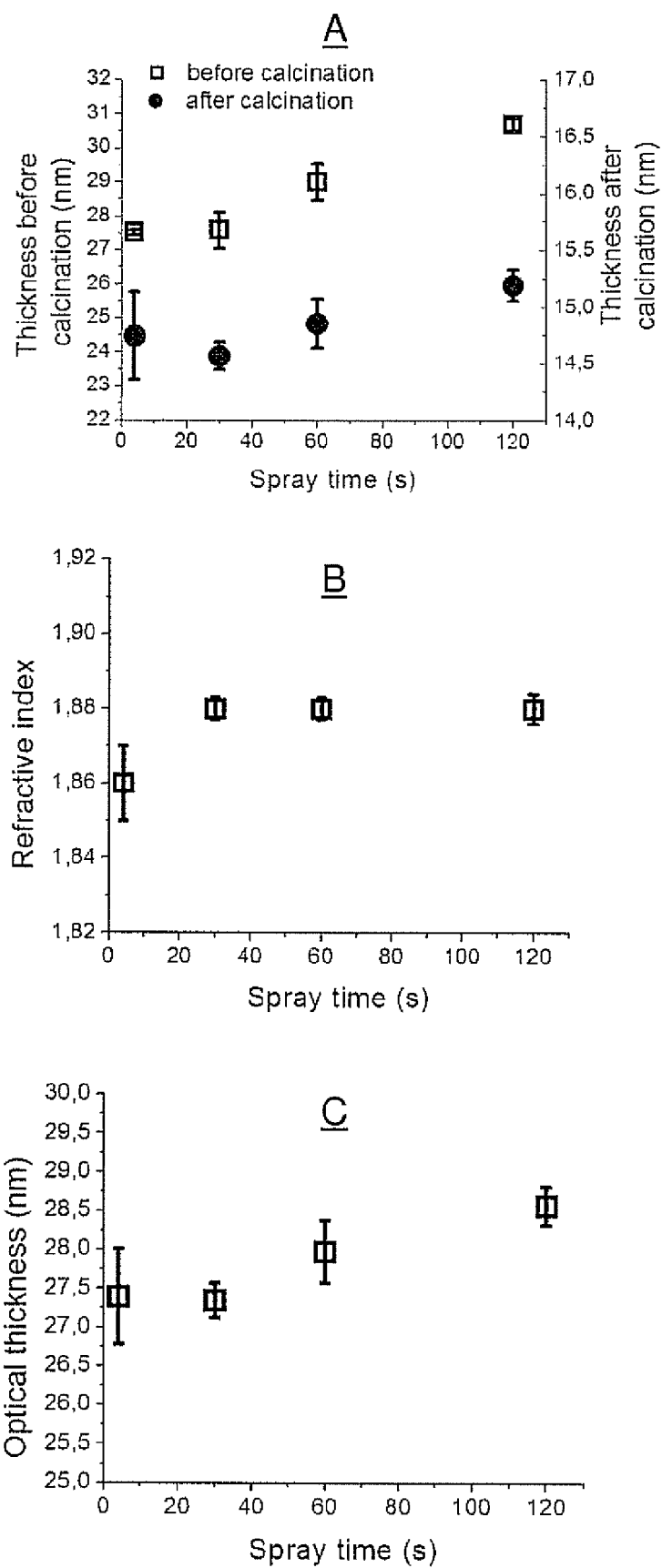
FIGS. 5A-5C are graphs showing properties of [TiO$_2$(2.0)/PVS(2.0)]$_{10}$ stacks prepared using spray times between 4-120 seconds for both calcinated and uncalcinated stacks.
Figure 6:
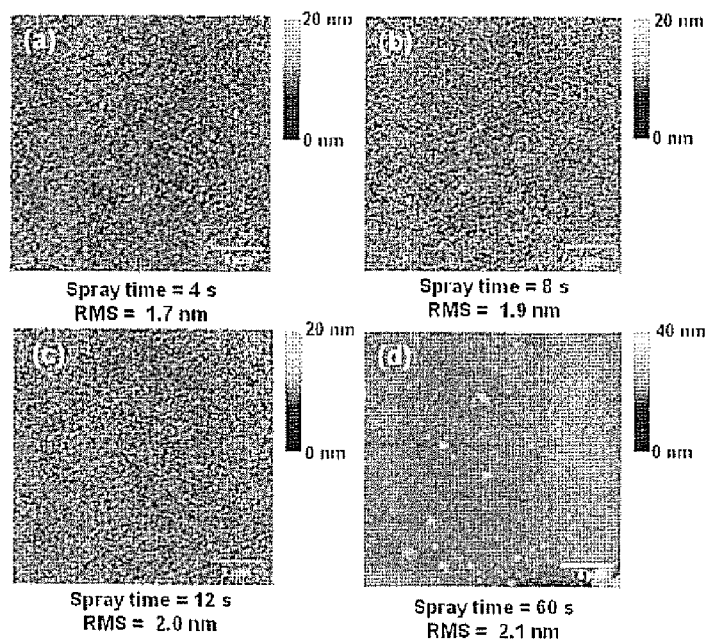
FIGS. 6a-6d are AFM tapping mode images of [TiO$_2$(2.0)/PVS(2.0)]$_{10}$ stacks assembled on microscope glass slides using a spray time of (a) 4 seconds; (b) 8 seconds; (c) 12 seconds; and (d) 60 seconds.

Multilayer film assemblies of $[TiO_2(2.0)/PVS(2.0)]_{30}$ were also affected by the spray time as shown in FIG. 4D-4F. The refractive index after calcination was calculated as 2.04±0.01 for all samples analyzed. In contrast to film thickness for $[PAH(7.5)/SiO_2(9.0)]_{60}$ stacks in which the polymer and nanoparticles adsorption reached its saturation limit at 12 s, spraying of the $[TiO_2(2.0)/PVS(2.0)]_{30}$ stacks did not exhibit an asymptotic thickness for adsorption for spray times up to 24 s. Therefore, an effort to observe a maximum absorption for $[TiO_2(2.0)/PVS(2.0)]$ stacks was performed by spraying 10 bilayer assemblies using spray times between 4 to 120 s with results shown in FIGS. 5 and 6. In particular, FIG. 5 illustrates that after calcination the film thickness was 15±0.5 nm and the refractive index was 1.87±0.01 for a spray time of 120 s. In addition, FIG. 6 illustrates AFM images and RMS values, with a 4 s spraying time long enough to fully cover the substrate and RMS values for all samples within an acceptable range. However, it should be noted that samples sprayed for 60 s or longer exhibited particle aggregates on the surface.

Also observed and shown in FIG. 5A is a continuous increase in film thickness for an increase in spray time. Though not being bound by theory, this unlimited growth of $[TiO_2(2.0)/PVS(2.0)]_{30}$ multilayer films for increasing spray times may indicate an incomplete charge reversal after each layer deposition. $TiO_2$ nanoparticles at pH 2.0 have lower charge density than $SiO_2$ nanoparticles at pH 9.0, as calculated by zeta potential measurements.[16] The high molecular weight of PVS allows higher deposition when compared to films assembled with low molecular weight polymers.[8,10,17] Therefore, the high molecular weight of PVS favors the adsorption on the substrate surface while the low charge density of the $TiO_2$ nanoparticles may be affecting the kinetics of the adsorption.

Figure 7:
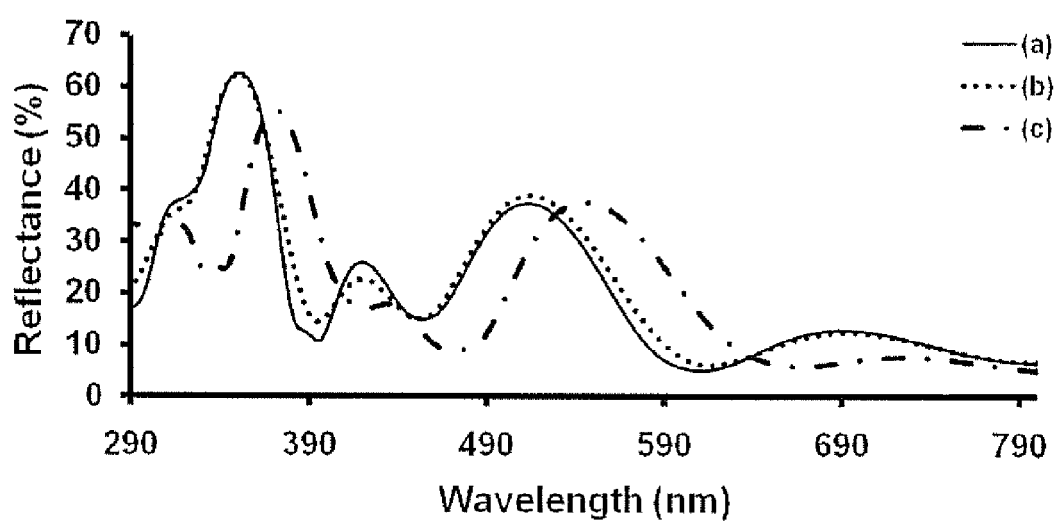
FIG. 7 is a graph illustrating UV-Vis spectroscopy spectra for five-stack films prepared by performing calcination: (a) after every stack; (b) after every SiO$_2$ stack; and (c) after the final and fifth stack.

Ellipsometry data of 5-stack films made of $[TiO_2(2.0)/PVS(2.0)]_{20}$ and $[PAH(7.5)/SiO_2(9.0)]_{60}$ are shown in Table 1 with the refractive index and thickness of each stack taken under three different conditions: a) calcination after spraying of each stack; b) calcination after spraying of each $SiO_2$ stack (stacks 2 and 4); and c) calcination after the fifth and final stack. The total thickness of the 5-stack films was higher in non-calcinated samples as shown in the UV-Vis spectra of FIG. 7 by a shift in the reflectance peaks for the sample calcinated only after the last and fifth stack (curve c) compared to the samples calcinated after every stack (curve a) and calcinated after every $SiO_2$ stack (curve b). It is appreciated that all the samples presented similar reflectance intensity, so the shift in the reflectance peak could be attributed to variations in film thickness for non-calcinated samples. This increase in thickness is strongly observed in the $4^{th}$ stack.

TABLE 1

| Stack | Calcination after each stack | | Calcination after SiO2 stack* | | No calcination* | |
|---|---|---|---|---|---|---|
| | RI @ 630 nm | thickness (nm) | RI @ 630 nm | thickness (nm) | RI @ 630 nm | thickness (nm) |
| 1 | 1.93 | 30 | 1.89 | 30 | 1.90 | 30 |
| 2 | 1.27 | 385 | 1.26 | 385 | 1.28 | 361 |
| 3 | 1.88 | 30 | 1.98 | 22 | 1.90 | 30 |
| 4 | 1.26 | 339 | 1.27 | 367 | 1.25 | 419 |
| 5 | 1.88 | 30 | 1.97 | 24 | 1.90 | 30 |

*All samples were calcinated after the $5^{th}$ stack

Figure 8:
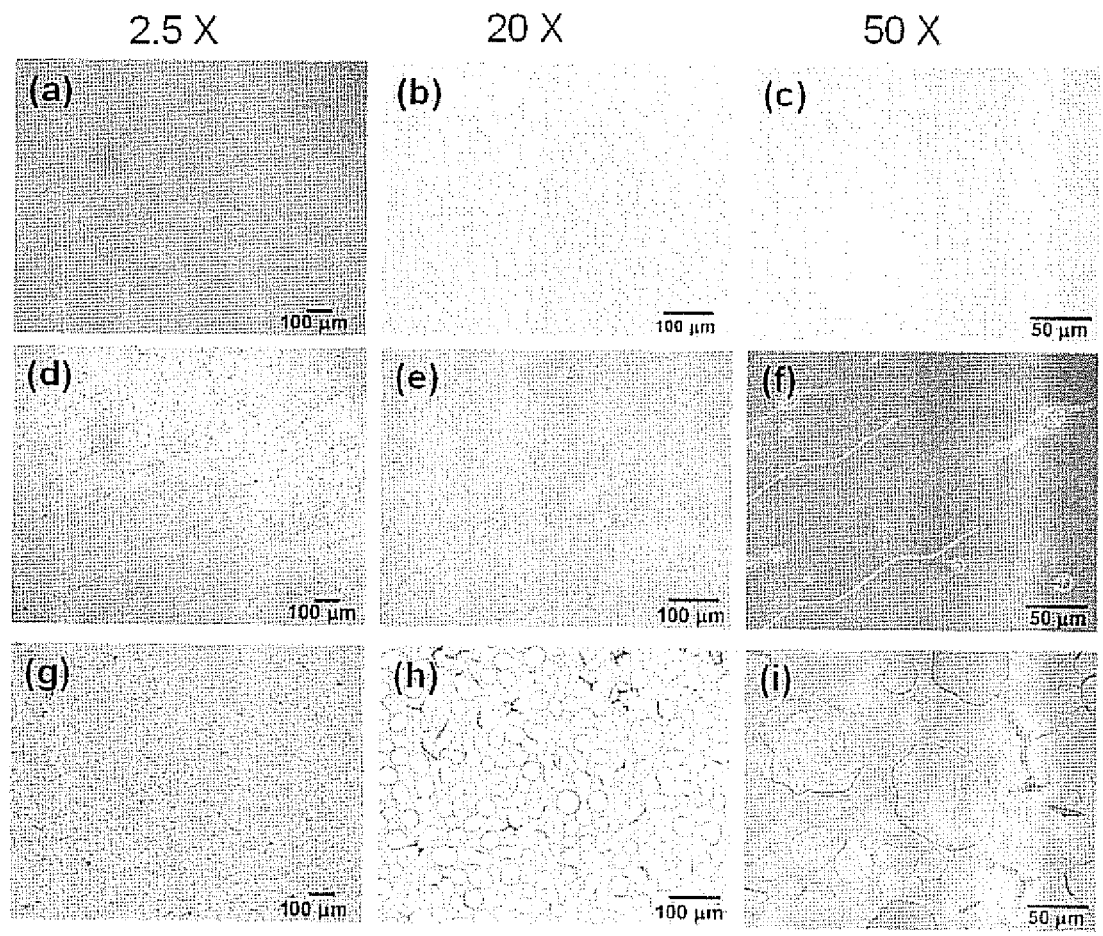
FIGS. 8a-8i are optical microscope images of five-stack films prepared by: (a)-(c) calcination after each stack; (d)-(f) calcination after each SiO$_2$ stack and after the fifth and final stack; and (g)-(i) calcination only after the fifth and final stack.

Despite the small changes in reflectance and roughness, films prepared with calcination only after the fifth and final stack, and calcination after every $SiO_2$ stack scattered light to an extent that made them unsuitable for high quality optical performance. The role of surface roughness in this scatter phenomenon was revealed by the surface morphology of the three different samples using optical microscopy. In particular, FIG. 8 shows optical microscope images at three different magnifications (2.5×, 20×, 50×) for 5-stack samples calcinated according to the three different conditions mentioned above: a) calcination after spraying of each stack; b) calcination after spraying of each $SiO_2$ stack (stacks 2 and 4); and c) calcination after the fifth and final stack.

As shown in the images, calcination after each stack resulted in the smoothest surfaces with no topographical features visible from 2.5× to 50× magnification. In contrast, films for which calcination was carried out after every $SiO_2$ stack and only after the fifth stack showed cracks and round agglomerates over their entire surfaces. Such surface features likely caused the observed light scattering mentioned above.

Not being bound by theory, for polymer/$SiO_2$ nanoparticle systems, calcination removes the polymer and increases the fraction of void space. For the $SiO_2$ system the resultant film does not collapse after calcination and there is not a significant change in the total thickness. In contrast, the calcination of polymer/$TiO_2$ nanoparticle systems leads to polymer removal, subsequent collapse of the $TiO_2$ nanoparticles films and in a significant decrease of the total thickness of the $TiO_2$ film.[8,10,16] When the $[TiO_2(2.0)/PVS(2.0)]_n$ stack is calcinated after its deposition, the nanoparticles are stabilized on the substrate or on the previous layer surface, so its structure is not disturbed by the deposition of the next stack. When calcination is not applied after the $[TiO_2(2.0)/PVS(2.0)]_n$ stack and $[PAH(7.5)/SiO_2(9.0)]_n$ is sprayed on top of it, the high pH value of PAH and $SiO_2$ solutions can lead to the rearrangement of $TiO_2$ nanoparticles in the underlying $TiO_2$ stacks. Additionally, calcination of the two-stack structure together leads to collapse the underlying TiO$_2$ nanoparticles, forming surface cracks and large aggregates, as observed in FIG. 8.

Figure 9:
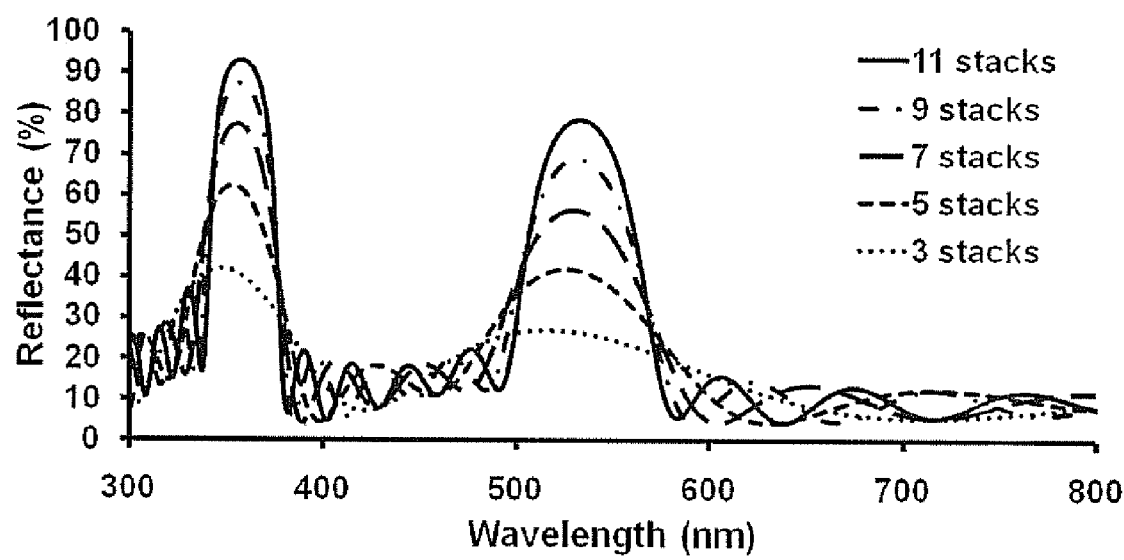
FIG. 9 is a plot illustrating a stimulated reflectance spectra for a TiO$_2$/SiO$_2$ multiple stack reflector having three to eleven stacks.

Computational simulation afforded design of multi-stack films with a narrow reflectance band in the near-UV range and a second reflectance in the range of visible light at wavelengths from 500 to 580 nm. For this simulation, refractive index was considered constant and thickness values of 25 nm and 385 nm for the TiO$_2$ and SiO$_2$ layers, respectively, were assumed. FIG. 9 shows the simulated reflectance spectrum for TiO$_2$/SiO$_2$ multiple-stack films with the multiple-stack film starting and ending with a TiO$_2$ stack having a refractive index 1.93 and the SiO$_2$ stacks having a refractive index of 1.25.

Figure 10:
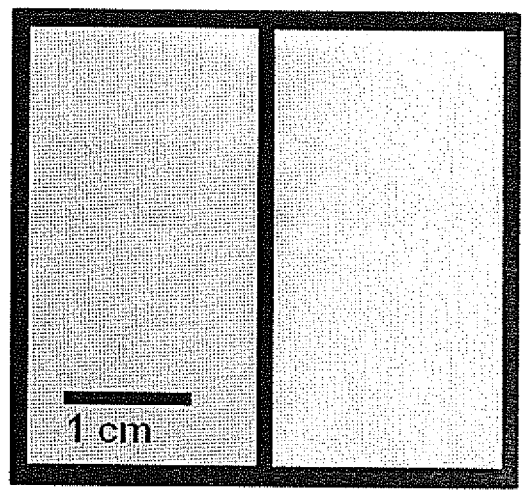
FIG. 10 is a photographic image of an eleven-stack TiO$_2$/SiO$_2$ film deposited on a microscope glass slide.

Corresponding multiple-stack films of [TiO$_2$(2.0)/PVS (2.0)]$_{20}$ and [PAH(7.5)/SiO$_2$(9.0)]$_{60}$ were sprayed on microscope glass slides via Spray-LbL processing until a desired number of stacks was obtained. Spray time, gas pressure and flow rate for polymer and nanoparticle solutions were set at 12 s, 25 psi and 16 mL/min, respectively. Calcination at 550° C. for 2 h was applied after each TiO$_2$ stack and each SiO$_2$ stack deposition in order to remove polymer material. Two photographic images taken at different angles of an 11-stack reflector and illustrating uniform thickness across the substrate are shown in FIG. 10. The RMS roughness for the 11-stack sample was 8 nm, significantly smoother than similar samples prepared via conventional dipping LbL (RMS=27 nm).[8]

Figure 11:
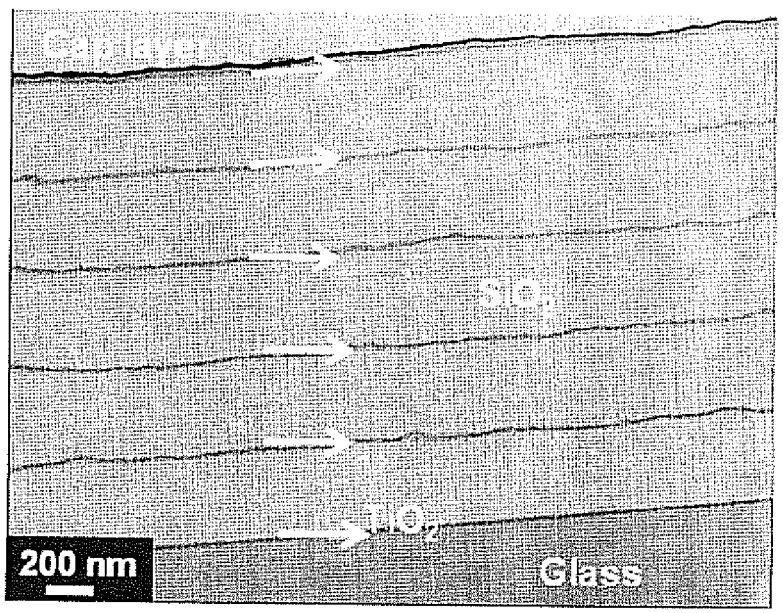
FIG. 11 is a cross-sectional transmission electron microscopy (TEM) image of an eleven-stack reflector made of alternating layers of TiO$_2$ (dark gray) and SiO$_2$ (light gray) nanoparticles assembled by a spray layer-by-layer process according to an embodiment of the present invention.

Cross-sectional TEM of an 11-stack reflector was performed with a TEM image shown in FIG. 11. The light gray regions are SiO$_2$ stacks and the dark gray lines are TiO$_2$ stacks. Both spray-LbL and conventional LbL[8] presented a similar structure of the multiple stacks.

Porosity of TiO$_2$ and SiO$_2$ stacks was dependent on the number of bilayers that were sprayed. For example, a 10 bilayer stack of SiO$_2$ nanoparticles had a porosity of ~42%, which is generally equivalent to a porosity of ~54% for samples prepared via conventional LbL assembly. TiO$_2$ stacks presented porosity values of ~15-20%, depending on the number of bilayers.

Figure 12:
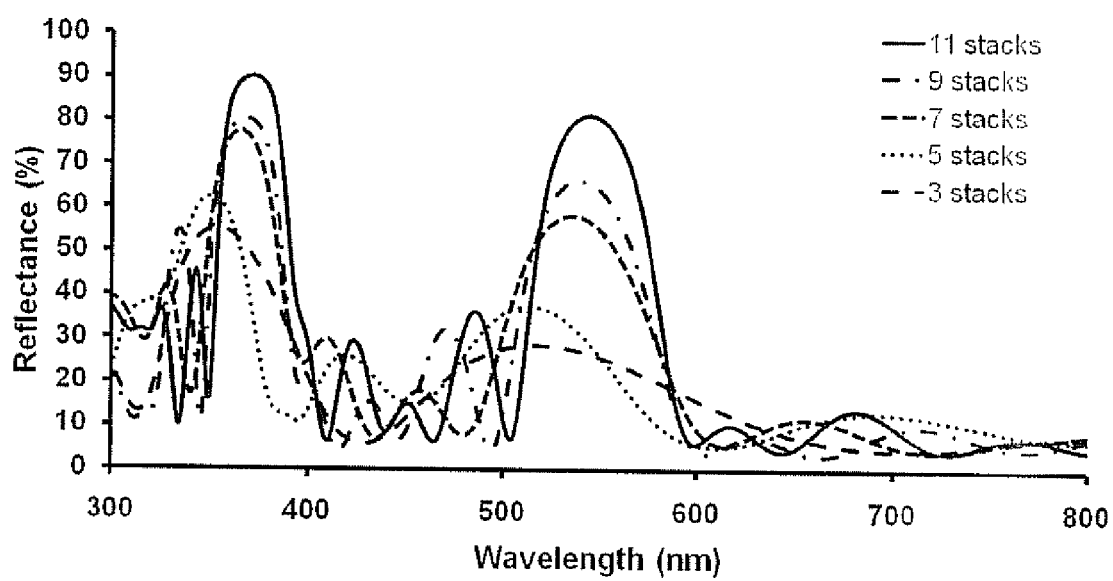
FIG. 12 is an experimentally determined reflectance spectra for TiO$_2$/SiO$_2$ multiple-stack reflectors having between three and eleven stacks.

FIG. 12 illustrates UV-Vis spectroscopy data collected for samples with 3 to 11 stacks for comparison to the simulations shown in FIG. 9. Reflectance at near-UV and visible light wavelengths increased by increasing the number of nanoparticle stacks, in agreement with the simulated data. In previous work[8], reflectance peak intensity in the near-UV decreased with increasing number of stacks and was attributed to surface roughness and/or to the absorption of UV light by TiO$_2$ nanoparticles. In the instant invention, smoother sprayed LbL films showed reflectance in the near-UV that increased with the number of stacks, as predicted by the simulations.

Figure 13:
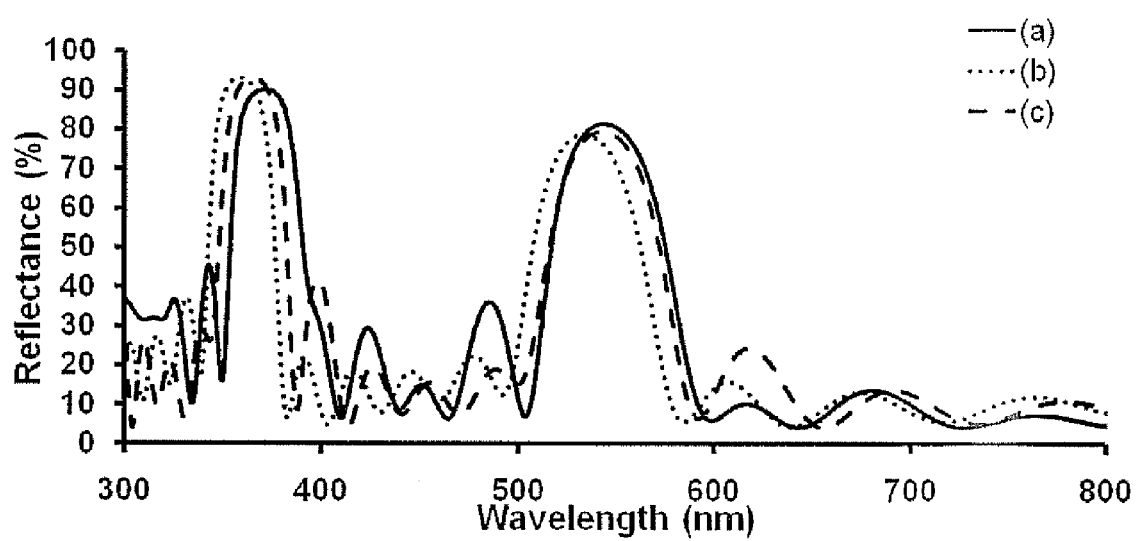
FIG. 13 is a graph illustrating UV-Vis spectra for an eleven-stack reflector obtained: (a) experimentally; (b) by simulation considering a constant reflective index; and (c) by simulation considering a reflective index as a function of light wavelength via Cauchy's equation.

FIG. 13 illustrates a comparison between experimental (curve a) and simulated data (curve b) for an 11-stack film. The original simulation assumed that the refractive index was constant over the range of the light wavelength analyzed, however, simulations for short wavelengths demonstrated that the refractive index is strongly dependent on the wavelength value and can significantly affect reflectance in the near-UV range. The refractive index correlates to the wavelength of light as described by the Cauchy's equation: $n(\lambda) = A + B/\lambda^2 + C/\lambda^4 + \ldots$, where n is the refractive index, is the wavelength of light and A, B and C are the coefficients determined by the material. However, as the wavelength of light decreases, its influence on the refractive index becomes more expressive and it affects the calculation of the reflectance, which is a function of the optical thickness. A simulation considering refractive index as a function of the wavelength, using the Cauchy's equation (curve c) is also shown in FIG. 13. A better match with the experimental curve was obtained, indicating that adjusting simulation parameters can afford more precise design and prediction of the reflectance of multiple-stack films.

The invention is not restricted to the illustrative examples and embodiments described above. The examples and embodiments are not intended as limitations on the scope of the invention. Methods, processes, apparatus, compositions, and the like described herein are exemplary and not intended as limitations on the scope of the invention. Changes herein and other uses will occur to those skilled in the art. The scope of the invention is defined by the scope of the claims.

REFERENCES

1. Parker, A. R., 515 million years of structural colour. *Journal of Optics A: Pure and Applied Optics* 2000, (6), R15.
2. Parker, A. R., Natural photonic engineers. *Materials Today* 2002, 5, (9), 26-31.
3. Parker, A. R.; Townley, H. E., Biomimetics of photonic nanostructures. *Nat Nano* 2007, 2, (6), 347-353.
4. Banerjee, D.; Grayson, B. A.; Zhang, M.; Ishii, M. Multilayer photonic structures having omni-directional reflectivity and coatings incorporating the same. US Patent Application 20090153953, 2009.
5. Banerjee, D.; Zhang, M.; Ishii, M. Narrow Band Omnidirectional Reflectors and their use as Structural Colors. US Patent Application 20090046368, 2009.
6. Hunt, S.; Cuthill, I. C.; Bennett, A. T. D.; Church, S. C.; Partridge, J. C., Is the ultraviolet waveband a special communication channel in avian mate choice? *J Exp Biol* 2001, 204, (14), 2499-2507.
7. Klem Jr, D., Preventing Bird-Window Collisions. *The Wilson Journal of Ornithology* 2009, 121, (2), 314-321.
8. Kurt, P.; Banerjee, D.; Cohen, R. E.; Rubner, M. F., Structural Color via Layer-by-layer Deposition: Layered Nanoparticle Arrays with Near-UV and Visible Reflective Bands. *Journal of Materials Chemistry* 2009, 19, 8920-8927.
9. Berdahl, P.; Akbari, H.; Levinson, R.; Miller, W. A., Weathering of roofing materials—An overview. *Construction and Building Materials* 2008, 22, (4), 423-433.
10. Wu, Z.; Lee, D.; Rubner, M. F.; Cohen, R. E., Structural Color in Porous, Superhydrophilic, and Self-Cleaning SiO2/TiO2 Bragg Stacks. *Small* 2007, 3, (9), 1467.
11. Decher, G.; Schlenoff, J. B., *Mutilayer Thin Films: Sequential Assembly of Nanocomposite Materials*. Wiley-VCH: New York, 2003.
12. Krogman, K. C.; Zacharia, N. S.; Schroeder, S.; Hammond, P. T., Automated Process for Improved Uniformity and Versatility of Layer-by-Layer Deposition. *Langmuir* 2007, 23, (6), 3137-3141.
13. Krogman, K. C.; Lowery, J. L.; Zacharia, N. S.; Rutledge, G. C.; Hammond, P. T., Spraying asymmetry into functional membranes layer-by-layer. *Nat Mater* 2009, 8, (6), 512-518.
14. Krogman, K. C.; Lowery, J. L.; Zacharia, U.S. Patent Application Publication No. 2010/0003499, filed Jul. 6, 2009, published Jan. 7, 2010.
15. Choi, W.; Termin, A.; Hoffmann, M. R., The Role of Metal Ion Dopants in Quantum-Sized TiO2: Correlation between Photoreactivity and Charge Carrier Recombination Dynamics. *The Journal of Physical Chemistry* 1994, 98, (51), 13669-13679.
16. Lee, D.; Omolade, D.; Cohen, R. E.; Rubner, M. F., pH-Dependent Structure and Properties of TiO2/SiO2 Nanoparticle Multilayer Thin Films. *Chemistry of Materials* 2007, 19, (6), 1427-1433.
17. Rahman, M.; Taghavinia, N., Layer-by-layer self assembly deposition and characterization of TiO2 nanoparticles by using a short chain polycation. *The European Physical Journal Applied Physics* 2009, 48, 1062.

We claim:

1. A process for fabricating a structural color having ultraviolet reflectance, the process comprising:
providing an atomizing nozzle;
providing a first nanoparticle solution and a second nanoparticle solution;
spraying a plurality of first nanoparticle solution layers;
the plurality of first nanoparticle layers forming a low index of refraction stack;
spraying a plurality of second nanoparticle solution layers;
the plurality of second nanoparticle layers forming a high index of refraction stack;
spraying additional layers to form a plurality of alternating low index of refraction stacks and high index of refraction stacks, the low index of refraction stacks extending across the high index of refraction stacks and vice versa; and
calcinating the low index of refraction stacks and the high index of refraction stacks to form a plurality of alternating low index of refraction layers and high index of refraction layers;
the alternating low index of refraction layers and high index of refraction layers having a dual reflection spectrum that reflects electromagnetic radiation in an ultraviolet region and a narrow band of electromagnetic radiation in a visible region; wherein the plurality of alternating low index of refraction layers and high index of refraction layers reflect more than 70% of the electromagnetic radiation in the ultraviolet region and more than 60% of the narrow band of electromagnetic radiation in the visible region.

2. The process of claim 1, wherein the plurality of low index of refraction stacks and high index of refraction stacks each have a non-quarter Nave thickness.

3. The process of claim 1, wherein the first nanoparticles are $SiO_2$ nanoparticles and the second nanoparticles are $TiO_2$ nanoparticles.

4. The process of claim 1, wherein the plurality of alternating stacks of low index of refraction and high index of refraction are in the form of a flake.

5. The process of claim 4, wherein the flake is a pigment for a paint.

6. The process of claim 1, wherein the spraying is computer controlled.

7. The process claim 1, wherein the plurality of alternating layers of low index of refraction layers and high index of refraction layers have a layered structure described by [A 0.5qH pL (qH pL)$^N$ 0.5qH G], where:
A represents air;
q is a multiplier of a quarter wave thickness of the high index of refraction layers;
H is the quarter wave thickness of the high refracting index layers for a given wavelength $\lambda_0$;
p is a multiplier of a quarter wave thickness of the low index of refraction material;
L is the thickness of the low refracting index layer for the given wavelength $\lambda_0$;
N represents the total number of layers between bounding layers of the high index of refraction material; and
G represents a substrate.

8. A process for fabricating a structural color having ultraviolet reflectance, the process comprising:
providing a plurality of atomizing nozzles;
providing a first nanoparticle solution and a first polymer solution;
providing a second nanoparticle solution and a second polymer solution;
spraying a plurality of first nanoparticle bilayers, each first nanoparticle bilayer made by spraying a first nanoparticle solution layer and a first polymer solution layer using a first set of the plurality of atomizing nozzles;
rinsing each first nanoparticle bilayer using a second set of the plurality of atomizing nozzles before an additional first nanoparticle bilayer is sprayed;
the plurality of first nanoparticle bilayers forming a low index of refraction stack;
spraying a plurality of second nanoparticle bilayers, each second nanoparticle bilayer made by spraying a second nanoparticle solution layer and a second polymer solution layer;
rinsing each second nanoparticle bilayer before an additional second nanoparticle bilayer is sprayed;
the plurality of second nanoparticle bilayers forming a high index of refraction stack;
spraying additional layers to form a plurality of alternating low index of refraction stacks and high index of refraction stacks, the low index of refraction stacks extending across the high index of refraction stacks and vice versa; and
decomposing the first polymer from the low index of refraction stacks and the second polymer from the high index of refraction stacks and forming a plurality of alternating low index of refraction layers and high index of refraction layers;
the alternating low index of refraction layers and high index of refraction layers having a dual reflection spectrum that reflects electromagnetic radiation in an ultraviolet region and a narrow band of electromagnetic radiation in a visible region; wherein the plurality of alternating low index of refraction layers and high index of refraction layers reflect more than 70% of the electromagnetic radiation in the ultraviolet region and more than 60% of the narrow band of electromagnetic radiation in the visible region.

* * * * *